(12) United States Patent
Planche et al.

(10) Patent No.: US 10,427,667 B2
(45) Date of Patent: Oct. 1, 2019

(54) METHOD FOR AUTOMATICALLY SWITCHING A MOTOR VEHICLE TO FREEWHEEL MODE

(71) Applicants: RENAULT S.A.S., Boulogne Billancourt (FR); GETRAG FORD TRANSMISSIONS GmbH, Cologne (DE)

(72) Inventors: Grégory Planche, Orsay (FR); Bertrand Nodin, Igny (FR); Pedro Moreno Lahore, Paris (FR); Harald Schmitz, Dortmund (DE); Axel Prenger-Berninghoff, Erkelenz (DE)

(73) Assignees: RENAULT S.A.S., Boulogne Billancourt (FR); GETRAG FORD TRANSMISSIONS GMBH, Cologne (DE)

( * ) Notice: Subject to any disclaimer, the term of this patent is extended or adjusted under 35 U.S.C. 154(b) by 166 days.

(21) Appl. No.: 15/531,848

(22) PCT Filed: Dec. 10, 2015

(86) PCT No.: PCT/EP2015/079219
§ 371 (c)(1),
(2) Date: May 31, 2017

(87) PCT Pub. No.: WO2016/102188
PCT Pub. Date: Jun. 30, 2016

(65) Prior Publication Data
US 2017/0282887 A1 Oct. 5, 2017

(30) Foreign Application Priority Data

Dec. 23, 2014 (FR) .................................... 14 63182

(51) Int. Cl.
*B60W 10/02* (2006.01)
*B60W 10/06* (2006.01)
(Continued)

(52) U.S. Cl.
CPC ...... *B60W 10/02* (2013.01); *B60W 30/18072* (2013.01); *B60W 30/19* (2013.01);
(Continued)

(58) Field of Classification Search
CPC ................. B60W 10/02; B60W 10/06; B60W 30/18072; B60W 30/19; B60W 30/20; B60W 2030/1809
See application file for complete search history.

(56) References Cited

U.S. PATENT DOCUMENTS

| 2004/0138027 | A1* | 7/2004 | Rustige | ................. | B60W 10/02 477/175 |
| 2012/0088629 | A1* | 4/2012 | Aoyama | ............... | B60W 10/02 477/39 |

(Continued)

FOREIGN PATENT DOCUMENTS

| DE | 102012212230 A1 | 1/2014 |
| EP | 2374678 A1 | 10/2011 |

(Continued)

*Primary Examiner* — Edwin A Young
(74) *Attorney, Agent, or Firm* — Browdy and Neimark, P.L.L.C.

(57) ABSTRACT

The invention concerns a method for automatically controlling a motor vehicle (10) for switching from a "normal" mode to a "freewheel" mode, the vehicle (10) comprising an engine (12) capable of providing engine torque to drive wheels (14) via an automatically controlled clutch device (18) that comprises a drive shaft (15) and a driven shaft (16). A transition step (E1) is interposed chronologically between the "normal" mode and the "freewheel mode" during which the engine (12) is automatically controlled in such a way that (Continued)

the driven shaft (16) and the drive shaft (15) turn at the same speed without transmitting torque to the drive wheels (14).

13 Claims, 1 Drawing Sheet

(51) Int. Cl.
   *B60W 30/18* (2012.01)
   *B60W 30/20* (2006.01)
   *B60W 30/19* (2012.01)
(52) U.S. Cl.
   CPC ..... *B60W 30/20* (2013.01); *B60W 2030/1809* (2013.01); *B60W 2030/18081* (2013.01); *B60W 2510/0657* (2013.01); *B60W 2520/10* (2013.01); *B60W 2540/10* (2013.01); *B60W 2540/12* (2013.01); *B60W 2540/16* (2013.01); *B60W 2710/021* (2013.01); *B60W 2710/025* (2013.01); *Y02T 10/76* (2013.01)

(56) References Cited

U.S. PATENT DOCUMENTS

| | | | |
|---|---|---|---|
| 2013/0138313 A1* | 5/2013 | Iwao | B60T 8/172 |
| | | | 701/67 |
| 2013/0296123 A1* | 11/2013 | Doering | B60W 10/02 |
| | | | 477/5 |
| 2014/0221156 A1 | 8/2014 | Sugimura et al. | |
| 2016/0046291 A1 | 2/2016 | Roudeau et al. | |

FOREIGN PATENT DOCUMENTS

| | | |
|---|---|---|
| EP | 2865913 A1 | 4/2015 |
| FR | 2824790 A1 | 11/2002 |
| FR | 3005021 A1 | 10/2014 |
| WO | 2013190653 A1 | 12/2013 |

\* cited by examiner

METHOD FOR AUTOMATICALLY SWITCHING A MOTOR VEHICLE TO FREEWHEEL MODE

TECHNICAL FIELD OF THE INVENTION

The invention relates to a method for automatically controlling a motor vehicle for switching from a "normal" mode to a "freewheel" mode, the vehicle comprising an engine which is capable of supplying a drive torque to drive wheels via an automatically controlled clutch device which comprises a drive shaft and a driven shaft, in which, in "normal" mode, the drive wheels are coupled as often as possible with the engine via the clutch device, while in "freewheel" mode, the drive wheels are permanently decoupled from the engine by disengagement of the clutch device to allow the engine to run at idle speed so long as no braking or acceleration command is given by the driver.

BACKGROUND OF THE INVENTION

Motor vehicles driven by a combustion engine generally include a manual or automatic gearbox which is interposed in the chain of transmission of the drive torque to the drive wheels of the vehicle. To make it possible to change the gear of the vehicle, it is generally necessary to decouple the engine from the gearbox, in particular by means of a clutch device. In what is referred to as the "normal" mode of operation of the vehicle, the clutch device is as often as possible in the engaged position. The clutch device is generally temporarily disengaged only during gear changes or indeed when the vehicle is stationary.

It is well known that motor vehicles consume less fuel when they are "freewheeling", i.e. when they are using only their kinetic energy and possibly their weight to travel as far as possible without the engine exerting a braking torque on the wheels of the vehicle, also referred to as "engine braking".

A method for controlling the vehicle switching from "normal" mode to "freewheel" mode is already known. In this prior art control method, as soon as the conditions are fulfilled that enable the vehicle to continue to travel without the aid of the engine, the clutch device is commanded into the disengaged position and the engine speed is reduced to idle or even zero speed. Such a method is satisfactory in that it saves fuel.

Nevertheless, the sudden opening of the clutch device causes a sudden sensation of deceleration for the passengers of the vehicle.

Furthermore, if the driver of the vehicle decides to return to "normal" mode when the vehicle has just entered "freewheel" mode, the clutch device suddenly returns to the engaged position while the engine is running at idle or even zero speed. This causes a jolt for the passengers in the vehicle.

Such a jolt can be avoided provided that it is waited for the engine to regain a speed corresponding to the speed of rotation of the wheels of the vehicle. Such a delay may be detrimental in certain situations, especially when the switch to "freewheel" mode has been carried out automatically, against the wishes of the driver.

BRIEF SUMMARY OF THE INVENTION

To overcome these problems, the invention proposes a method of the type described above, characterized in that a transition step is interposed chronologically between the "normal" mode and the "freewheel" mode, in which step the engine is automatically controlled so that the driven shaft and the drive shaft rotate at the same speed without transmission of torque to the drive wheels.

According to other features of the invention:
- during the transition step, the clutch device remains in the engaged position;
- during the transition step, the clutch device is commanded into the disengaged position;
- during the transition step, the clutch device is commanded into a biting point position;
- the transition step is triggered when the acceleration commanded by the driver is less than a predetermined value and when the drive torque transmitted to the driven shaft by the clutch device is less than or equal to a predetermined trigger torque;
- the trigger torque is positive;
- the trigger torque is zero;
- the trigger torque is negative;
- triggering of the transition step is postponed by a predetermined period when a gear is being changed in a gearbox of the vehicle;
- "free wheel" mode is triggered when no acceleration or braking has been commanded by the driver during the transition step before the end of a predetermined time period
- the vehicle is equipped with an automatically controlled gearbox, the gear to be engaged being controlled as a function of the speed of travel of the vehicle so that, in the event of an interruption of the "freewheel" mode, no change in gear is required when the clutch device passes into the engaged position;
- the transition step and the "freewheel" mode may be interrupted at any time when acceleration or braking is commanded by the driver;
- the transition step and the "freewheel" mode may be interrupted at any time when the speed of travel of the vehicle becomes less than a predetermined speed or when a gear change is commanded manually by the driver.

BRIEF DESCRIPTION OF THE FIGURES

Further features and advantages of the invention will become apparent on reading the following detailed description, for the understanding of which reference will be made to the accompanying drawings, in which.

DETAILED DESCRIPTION OF THE FIGURES

In the rest of the description, elements having an identical structure or similar functions will be designated by the same reference signs.

Figure 1:
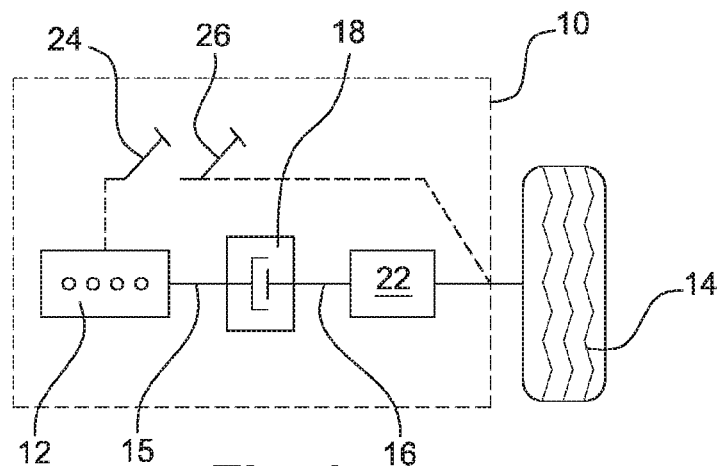
FIG. 1 is a schematic view showing a motor vehicle engine and a chain for transmission of torque to a drive wheel of the vehicle, the transmission chain comprising a gearbox and a clutch device.

FIG. 1 schematically shows a motor vehicle 10 which is driven by an internal combustion engine 12 producing a drive torque.

Alternatively, the vehicle is driven by an electric engine or a hybrid engine.

The engine 12 is intended to drive at least one drive wheel 14 of the vehicle 10 via a transmission chain for transmitting the drive torque.

The transmission chain comprises a drive shaft 15 which is driven in rotation directly by the engine 12. The drive shaft 15 may be coupled to a driven shaft 16 via an automatically controlled clutch device 18.

Figure 2:
FIG. 2 schematically shows two electronic control units associated with the engine and with the transmission chain, respectively.

In this case, it is a friction clutch device 18, which is controlled by a first electronic control unit 20 shown in FIG. 2. Numerous embodiments of such devices are well known in the prior art.

The clutch device 18 may be commanded between:
a first engaged end position in which the drive shaft 15 and the driven shaft 16 are coupled, the whole of the drive torque being transmitted to the driven shaft 16;
a second disengaged end position in which the drive shaft 15 and the driven shaft 16 are decoupled, the drive shaft 15 and the driven shaft 16 then being capable of rotating at different speeds without interaction with one other.

By way of non-limiting example, the clutch device 18 shown in FIG. 1 is also capable of occupying an intermediate biting point position in which only a part of the drive torque is transmitted to the driven shaft 16.

The driven shaft 16 is coupled to the drive wheel 14 via a gearbox 22. In this case, it is an automatic or robotic gearbox 22, which is controlled by said first electronic control unit 20 shown in FIG. 2.

As a variant of the invention that is not shown, the gearbox consists of a manual gearbox.

The speed of the engine 12 may be controlled by the driver of the vehicle, for example by means of an accelerator pedal 24.

The speed of the engine 12 may also be controlled automatically by a second electronic control unit 24 which is shown in FIG. 2.

In addition, the driver of the vehicle may brake the vehicle by acting on a braking system via a brake pedal 26.

The vehicle 10 is capable of operating in what is referred to as a "normal" mode, in which the drive wheel 14 is coupled as often as possible with the engine 12. The only time the clutch device 18 is commanded into the disengaged position is during a gear change of the gearbox 22.

The vehicle 10 is also capable of being commanded into what is referred to as a "freewheel" mode of operation, in which the clutch device 18 is commanded by the first electronic control unit into the disengaged position and in which the engine 12 is commanded by the first electronic control unit 20 to rotate at a low speed relative to the speed of travel of the vehicle, for example at idle speed. Such a "freewheel" mode is already known as "sailing mode". The conditions for automatic switch to "freewheel" mode will be described in detail below.

In "freewheel" mode, the vehicle 10 thus continues to move under the effect of its own kinetic energy, which is supplemented by gravity when the vehicle is descending a sloping road. This mode saves fuel by reducing the speed of the engine 12. The vehicle 10 is capable of continuing to roll in "freewheel" mode for longer as the braking torque provided by the internal friction of the engine 12, also called "engine braking", is not transmitted to the drive wheels 14 since the clutch device 18 is in the disengaged position.

Figure 3:
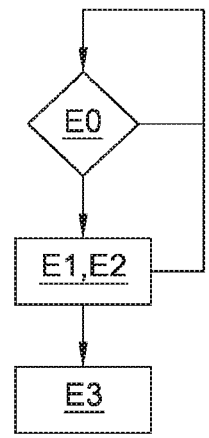
FIG. 3 is a block diagram showing the method performed according to the teachings of the invention.

The method for automatically controlling the switch from "normal" mode to "freewheel" mode is now described with reference to FIG. 3.

A first transition step "E1" is interposed chronologically between "normal" mode and "freewheel" mode.

Triggering of the transition step "E1" is subject to at least the following two trigger conditions:
the acceleration commanded by the driver is less than a predetermined value; and
the drive torque transmitted to the driven shaft 16 by the clutch device 18 is less than or equal to a predetermined trigger torque.

In a variant, at least one of the following trigger conditions will be added to these first two trigger conditions:
no braking is commanded by the driver;
the gearbox is in automatic mode, in order to prevent the driver from activating gear speeds which are unsuitable for returning to "normal" mode after "freewheel" mode;
the speed of travel of the vehicle is within a predetermined range in order to prevent the vehicle from gathering too much speed or, on the contrary, to prevent the vehicle from stopping;
the gradient of the road in the direction of descent is less than a predetermined threshold, in order to prevent the vehicle from gathering too much speed in "freewheel" mode;
the lateral acceleration of the vehicle is less than a predetermined threshold, in order to avoid "freewheel" mode being triggered in too tight turns.

All of the selected trigger conditions must be satisfied simultaneously in order for the transition step "E1" to be triggered. If not, the vehicle 10 remains in "normal" mode. These conditions are verified during a preliminary verification step "E0".

The acceleration commanded is, for example, determined by the degree of depression of the accelerator pedal 24. In this case, when the degree of depression of the accelerator pedal 24 is less than a predetermined value, it is deemed that the first trigger condition of transition step "E1" is fulfilled.

Figure 4:
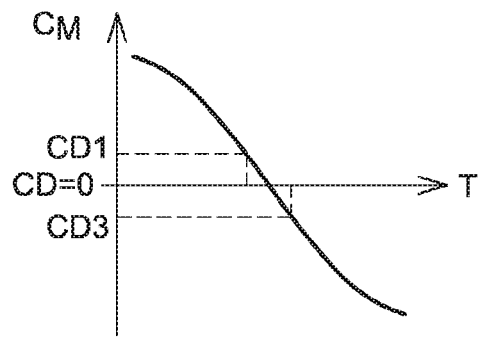
FIG. 4 is a diagram showing the decrease in the drive torque transmitted to the driven shaft by the clutch device in the engaged position when the accelerator pedal has just been released after having been depressed.

With regard to the second trigger condition, when the accelerator pedal 24 is released below the predetermined value after being depressed more strongly, the torque produced by the engine 12 is reduced. As shown in FIG. 4, the drive torque "CM" transmitted to the driven shaft 16 via the clutch device 18 in the engaged position begins to decrease and approaches zero. When the accelerator pedal 24 is completely released by the driver, the drive torque is likely to become negative. The latter case illustrates the "engine braking" effect in which the engine 12 no longer produces any drive torque and in which the internal friction of the engine 12 tends to produce a negative torque which opposes the rotation of the driven shaft 16.

According to a first embodiment of the invention, the predetermined trigger torque "CD1" is positive. In other words, the second trigger condition of step "E1" is satisfied when a drive torque is actually transmitted to the driven shaft 16. This drive torque is, for example, slightly greater than zero.

According to a second embodiment of the invention, the predetermined trigger torque "CD2" is zero. In other words, the second trigger condition of step "E1" is satisfied when no torque, positive or negative, is transmitted to the driven shaft 16.

According to a third embodiment of the invention, the predetermined trigger torque "CD3" is negative. In other words, the second trigger condition of step "E1" is satisfied when the driven shaft 16 begins to undergo the effects of engine braking. In this case, the driver of the vehicle is likely to feel a sudden jolt in the transition step "E1", as will be explained below.

Furthermore, during the preliminary verification step "E0", the second electronic control unit 20 checks that no gear change operation is underway. When a gear change in the gearbox 22 of the vehicle 10 is underway while all the other trigger conditions are satisfied, the triggering of the transition step "E1" is postponed by a predetermined period sufficient to complete the gear change.

When all trigger conditions are satisfied during the preliminary step "E0", the transition step "E1" is triggered. During this transition step "E1", the engine 12 is automatically controlled so that the driven shaft 16 and the drive shaft 15 rotate at the same speed without transmission of drive torque to the drive wheels 14.

To prevent drive torque from being transmitted to the drive wheels 14, several variants are possible.

According to a first variant, during the transition step "E1", the clutch device 18 remains in the engaged position. The engine 12 is then controlled so that no drive torque or braking torque is transmitted to the driven shaft 16 by the drive shaft 15. This variant embodiment has the advantage of enabling the engine 12 to very rapidly resume control of the speed of rotation of the drive wheels 14 without any jolt for the driver.

According to a second variant, during the transition step "E1", the clutch device 18 is commanded into the disengaged position. In this case, no drive torque or braking torque is naturally transmitted to the driven shaft 16 by the drive shaft 15. This variant requires a simpler engine 12 control model than in the first variant. It is sufficient to measure the speed of rotation of the driven shaft 16 and to control the engine 12 so that the drive shaft 15 rotates at the same speed.

According to a third variant, during the transition step "E1", the clutch device 18 is commanded into the biting point position. This variant is an intermediate solution between the first variant and the second variant. This third variant allows the engine 12 to very rapidly resume control of the speed of rotation of the drive wheels 14 since the friction elements of the clutch device 18 are still in contact. Moreover, this third variant makes it possible to introduce a degree of tolerance of control of the engine since any torque transmitted to the driven shaft 16, whether drive torque or braking torque, is reduced.

This transition step "E1" is maintained for a predetermined time period.

During a verification step "E2" which takes place simultaneously to the transition step "E1", it is checked that no acceleration and no braking have been commanded by the driver during the transition step before the end of the specified time period.

If braking or acceleration has been commanded, the switch to "freewheel" mode is interrupted and the vehicle is automatically controlled in "normal" mode.

If all the conditions of the verification step "E2" are satisfied, "free wheel" mode is triggered in a subsequent third step "E3".

During this third step "E3", the device 18 is commanded into the disengaged position if it is not already in said position. The engine 12 is commanded by the electronic control unit 24 to an idle speed. This third step "E3" thus allows the vehicle to travel while saving fuel by virtue of the kinetic energy of said vehicle and possibly the potential energy of the vehicle in the event of descent.

During this third "freewheel" step "E3", the gearbox 22 is controlled in such a way that the gear change operations are automatically carried out to engage a gear speed corresponding to the speed of travel of the vehicle. Thus, in the event of an interruption of the "freewheel" mode, no change in gear is required when the clutch device 18 passes into the engaged position.

The method, in particular the transition step "E1" and the "freewheel" mode, may be interrupted at any time when acceleration or braking is commanded by the driver.

In addition, the method, in particular the transition step "E1" and the "freewheel" mode, may be interrupted at any time when the speed of travel of the vehicle becomes less than a predetermined speed or when a gear change is commanded manually by the driver.

The method carried out according to the teachings of the invention thus makes it possible to progressively perform the switch to "freewheel" mode via a transition step "E1" which allows a quasi-instantaneous return of the vehicle to "normal" mode since the engine 12 is always running at a speed close to that of the driven shaft 16. Such a method is particularly advantageous when the switch to "freewheel" mode is performed automatically whereas the driver feels that the road profile and/or the traffic conditions are not right for this mode.

Moreover, switching to "freewheel" mode after a predetermined time period still saves a lot of fuel when the driver feels that the road profile and/or the traffic conditions are right for this mode.

The invention claimed is:

1. A method for automatically controlling a motor vehicle for switching from a "normal" mode to a "freewheel" mode, the vehicle comprising an engine which is capable of supplying a drive torque to drive wheels via an automatically controlled clutch device which comprises a drive shaft and a driven shaft, the method comprising:
   in "normal" mode, coupling the drive wheels as often as possible with the engine via the clutch device,
   in "freewheel" mode, permanently decoupling the drive wheels from the engine by disengagement of the clutch device to allow the engine to run at idle speed so long as no braking or acceleration command is given by a driver, and
   in a transition step interposed chronologically after the "normal" mode and before the "freewheel" mode, automatically controlling the engine so that the driven shaft and the drive shaft rotate at the same speed without transmission of torque to the drive wheels.

2. The method as claimed in claim 1, characterized in that during the transition step, the clutch device remains in the engaged position.

3. The method as claimed in claim 1, characterized in that during the transition step, the clutch device is commanded into the disengaged position.

4. The method as claimed in claim 1, characterized in that during the transition step, the clutch device is commanded into a biting point position.

5. The method as claimed in claim 1, characterized in that the transition step is triggered when the acceleration commanded by the driver is less than a predetermined value and when the drive torque transmitted to the driven shaft by the clutch device is less than or equal to a predetermined trigger torque.

6. The method as claimed in claim 5, characterized in that the trigger torque is positive.

7. The method as claimed in claim 5, characterized in that the trigger torque is zero.

8. The method as claimed in claim 5, characterized in that the trigger torque is negative.

9. The method as claimed in claim 5, characterized in that triggering of the transition step is postponed by a predetermined period when a gear is being changed in a gearbox of the vehicle.

10. The method as claimed in claim 1, characterized in that "freewheel" mode is triggered when no acceleration or braking has been commanded by the driver during the transition step before the end of a predetermined time period.

11. The method as claimed in claim 1, characterized in that the vehicle is equipped with an automatically controlled gearbox, the gearbox being controlled to engage a gear speed as a function of the speed of travel of the vehicle so that, in the event of an interruption of the "freewheel" mode, no change in gear is required when the clutch device passes into the engaged position.

12. The method as claimed in claim 1, characterized in that the transition step and the "freewheel" mode may be interrupted at any time when acceleration or braking is commanded by the driver.

13. The method as claimed in claim 1, characterized in that the transition step and the "freewheel" mode may be interrupted at any time when the speed of travel of the vehicle becomes less than a predetermined speed or when a gear change is commanded manually by the driver.

* * * * *